Patented May 28, 1974

3,813,449
PROCESS FOR THE PREPARATION OF
FLUOROCARBON WAXES
Robert Hartwimmer and Eduard Weiss, Burghausen, Salzach, Germany, assignors to Farbwerke Hoechst Aktiengesellschaft vormals Meister Lucius & Bruning, Frankfurt am Main, Germany
No Drawing. Filed July 20, 1972, Ser. No. 273,508
Claims priority, application Germany, July 22, 1971,
P 21 36 639.2
Int. Cl. C07c 19/08
U.S. Cl. 260—653.1 R  4 Claims

ABSTRACT OF THE DISCLOSURE

The present invention relates to a process for the preparation of low molecular weight fluorocarbon waxes by thermal cracking of polytetrafluoroethylene or copolymers of tetrafluorethylene and higher perfluoro-olefins at elevated temperatures and pressures under the simultaneous influence of shearing and friction forces.

---

The present invention relates to a process for the preparation of fluorocarbon waxes, which is an improvement of the process of our copending application, Ser. No. 155,650/71.

Subject matter of the above application is a process for the preparation of fluorocarbon waxes by thermal cracking of polytetrafluorethylene or copolymers of tetrafluorethylene and higher perfluoroolefins at elevated temperatures and pressures, wherein the pyrolysis is carried out at a temperature of from 350° to 700° C. and a partial pressure of the degradation products of from 5 to 100 atm./g. Optionally, the pyrolysis may also be carried out in the presence of an inert gas, and in the presence of from 0.1 to 5% by weight, relative to the polymer used, of reaction accelerators, for example oxides of nitrogen or sulfur; sulfuryl, nitrosyl, nitroso or thionyl compounds, or substances which, under the pyrolysis conditions, set free the cited compounds.

It results from the above application that for the degradation of the polytetrafluoroethylene into the different wax types, on account of its high stability, rather long pyrolysis times of from about 2 to 8 hours are required.

It was therefore suprising to observe how the reaction time, instead of amounting to 2 to 8 hours, could be reduced to about 0.25 to 10 minutes, preferably 0.5 to 5 minutes, while maintaining the same temperature and pressure conditions, but by additionally using shearing and friction forces.

Subject matter of the present invention therefore is a process for the preparation of fluorocarbon waxes by thermal cracking of polytetrafluorethylene or copolymers of tetrafluorethylene and higher perfluoroolefins at a temperature in the range of from 350° to 700° C., preferably from 450° to 600° C., and a partial pressure of the degradation products of from 5 to 100 atm./g., preferably from 15 to 60 atm./g., wherein the cracking is carried out under the additional influence of shearing and friction forces.

Thus, the thermal cracking is carried out for example in reactors having a pressure resistant casing which can be heated to the desired temperature. In this reactor, there are present one or several kneader blades or shafts, on which mixing and kneading elements are mounted in such a manner that a maximum of the cited forces results. The walls of the reactors are preferably heated by electric means. In a preferred embodiment of the process of the invention which allows a continuous operation, the kneading and mixing elements are combined with conveyor and baffle elements.

The pressure of the degradation products which is establishing itself during the pyrolysis depends, apart from other factors, on the design of the pressure vessel, on the temperature, the kind and design of the mixing and kneading elements and on the kind of measurements taken. Generally, it is in the range of from 5 to 100 atm./g., preferably from 15 to 60 atm./g.

The process of the present invention thus permits the degradation of polytetrafluorethylene having a molecular weight of from about 1 to 10 million into fluorocarbon waxes having a low molecular weight, preferably of from about 2000 to 200,000, and a melting point of from 270° to 330° C., preferably from 300° to 325° C., now within a period of from 0.25 to 10 minutes, preferably from 0.5 to 5 minutes.

The cited periods of course are only reaction (pyrolysis) times without counting the heating time; the latter may widely vary depending on the capacity of the reaction vessel, the heating efficiency and the like and will therefore be different in every case.

Besides the substantially shortened reaction time, this process improvement allows a continuous and thus economic operation.

Suitable materials for the reactor are above all nitrided steels, and high temperature and acid resisting alloys of iron.

It is advantageous to maintain the most favorable values for the reaction operation by employing suitable automatic measuring and control devices.

The pyrolysis in accordance with the present invention is carried out advantageously in the presence of an inert gas, for example nitrogen or argon, or an inert gas similar in nature to the gaseous pyrolysis products, for example tetrafluoromethane, hexafluoroethane, or tetrafluorethylene. Under certain conditions, it may be advantageous also in this process to add small amounts, for example from 0.1 to 5% by weight, relative to the polymer used, of determined catalysts which accelerate the cracking of the high molecular weight fluorocarbon compounds. Such catalysts are for example: oxides of nitrogen, especially NO, $NO_2$ or mixtures thereof; oxides of sulfur, especially $SO_2$; nitrosyl, thionyl, sulfuryl and nitroso compounds, especially fluorides and chlorides. Furthermore, substances which, under the pyrolysis conditions cited, set free the above-mentioned compounds, for example amidosulfonic acid, potassium nitrite or silver nitrate, may be used as catalysts.

Suitable starting materials for the process of the invention are generally all fluorocarbon compounds of medium or high molecular weight, for example polytetrafluorethylene itself or its copolymers with other perfluoroolefins (molecular weight of from 0.5 to 7 million); furthermore high molecular weight polytetrafluorethylene waxes having a melting range of and above 300° C. (molecular weight of from about 10,000 to 100,000).

The above-mentioned copolymers are especially copolymers of tetrafluorethylene and other perfluoro-olefins, preferably hexafluoropropene or perfluoro-isobutylene, the amount of which in the copolymer is advantageously from 5 to 40% by weight, preferably from 20 to 30% by weight.

Not only polytetrafluoroethylene and its copolymers may be used as starting material according to the process of the invention, but also any waste products occurring during the production or processing of these plastics, which normally cannot be employed any more, may advantageously be used in the process of the invention. Thus, for example, any spoiled batches and/or smudged product parts, sieve or work-up residues of production, scraps and swarfs of machining and extruding plants for polytetrafluorethylene, as well as defective shaped articles from moulding and sintering processes may be used as starting material.

The waxes prepared according to the process of the invention are used above all as additives in the coating, lubricant and wax fields, thus substantially improving the properties of these products. The soluble fluorocarbon waxes may also be used as sprays for imparting water- and oil-repellent properties or corrosion resistance. The florocarbon waxes having a high melting point are valuable dry lubricants and lubricant additives; advantageously, mixture of these waxes with other plastics, for example, polyacetals, polypropylene, polyamides, phenol or epoxy resins, are used in the manufacture of self-lubricant bearings, pulleys, gear wheels, worms, slides or other pieces of apparatus under a considerable friction strain.

All fluorocarbon waxes are valuable auxiliaries in the metal processing industry, where they are increasingly used as mould release agents and additives for deep drawing processes.

The following examples illustrate the invention.

EXAMPLE 1

1.5 kg. of crushed polytetrafluorethylene wastes from a semi-finished goods manufacture are introduced into a kneader having a capacity of 3 liters, provided with two powerful sigma-type blades and with electric heating. After flushing with nitrogen, the kneader is rapidly heated to 500° C. Subsequently, the kneader blades are started at a speed of 40 r.p.m., which causes the temperature to rise to about 520° C. to 530° C. After a reaction time of 10 minutes, kneader blades and heating device are switched off and the kneader casing is cooled with air. The pressure establishing itself in the pyrolysis zone is from 16 to 18 atm./g. As soon as the temperature drops below 400° C., the reaction product is discharged by dumping with nitrogen flushing.

The brittle product of white color obtained with a yield of 97% has a melting range of from 321° to 323° C. and a viscosity of 16.500 cp. at 370° C.

EXAMPLE 2

Waste polytetrafluoroethylene having a grain size of from 200 to 2000 microns is introduced at a rate of 45 kg./h. by means of a dosage screw into an electrically heated, continuously operated two-shaft kneader-screw extruder of Messrs. Werner & Pfleiderer, Stuttgart-Feuerbach (shaft length 2265 mm., diameter of the conveyor, mixing, kneader and baffle elements 53 mm.). Heating is carried out in 5 temperature zones having a temperature of 380° C., 490° C., 530° C., 530° C. and 460° C., one after the other. The shaft is rotating at 200 r.p.m. The pressure establishing itself in the zone of pyrolysis is 80 atm./g., measured at a point about 20 cm. before the outlet nozzle. The degradation product discharged after a reaction time of 1 minute at the end of the extruder passing through a perforated plate (8 holes of a diameter of 4 mm. each) is granulated by means of a rotating knife, cooled in water, dehydrated over a sieve and dried in a drying cabinet at 180° C.

During the test, the interior of the machine is under a nitrogen blanket, and exhaust at the inlet and outlet openings prevents gaseous degradation products to escape into the surroundings.

The fluorocarbon wax obtained with a yield of 98% has a melting range of from 324° C. to 326° C. and a viscosity of 48.600 cp. at 370° C.

EXAMPLE 3

5.3 kg./h. of waste polytetrafluorethylene having a grain size of from 200 to 2000 microns are treated in a two-shaft kneader-screw extruder of the same design as described in Example 2, the shaft length being however of 770 mm. and the diameter of the conveyor, mixing, kneading and baffle elements of 28 mm., at mean temperatures of 380°, 480°, 550° 550° and 430° C. in the single temperature zones, and at a speed of 200 r.p.m. The other test conditions are similar to those described in Example 2, but the pressure establishing itself in the pyrolysis zone is from 40 to 50 atm./g., measured at a point about 20 cm. before the outlet nozzle.

The degradation product obtained with a yield of 97% after a reaction time in the machine of about 3 minutes has a melting range of from 317° to 320° C. and a viscosity of 3400 cp. at 370° C.

What is claimed is:

1. In the process for the preparation of fluorocarbon waxes by thermal cracking of polytetrafluorethylene or copolymers of tetrafluorethylene and higher perfluoroolefins at a temperature in the range of from 350° to 700° C. and a partial pressure of the degradation products of from 5 to 100 atm./g. the improvement which comprises carrying out the pyrolysis under the additional influence of shearing and friction forces.

2. A process as claimed in claim 1, wherein the additional forces are produced by suitable kneading elements.

3. A process as claimed in claim 2, wherein in a continuous operation, the kneading elements are used in combination with baffle and conveyor elements.

4. Fluorocarbon waxes, prepared by thermal cracking of polytetrafluorethylene or copolymers of tetrafluorethylene and higher perfluoro-olefins at temperatures of from 350° to 700° C. and partial pressures of the degradation products of from 5 to 100 atm./g., the pyrolysis being carried out under the additional influence of shearing and friction forces.

References Cited

UNITED STATES PATENTS 2,933,536   4/1960   Wall et al. _____ 260—653.1 R

DANIEL D. HORWITZ, Primary Examiner

U.S. Cl. X.R.

260—653.1 T